(12) United States Patent
Tse et al.

(10) Patent No.: US 6,207,748 B1
(45) Date of Patent: *Mar. 27, 2001

(54) ELASTOMERIC ETHYLENE COPOLYMERS FOR HOT MELT ADHESIVES

(75) Inventors: Mun Fu Tse, Seabrook; Aspy Keki Mehta; Vince Leo Hughes, both of Humble, all of TX (US)

(73) Assignee: Exxon Chemical Patents, Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/145,754

(22) Filed: Sep. 2, 1998

Related U.S. Application Data

(63) Continuation of application No. 08/610,601, filed on Mar. 8, 1996, now abandoned, which is a continuation of application No. 08/410,656, filed on Mar. 24, 1995, now Pat. No. 5,530,054, which is a continuation of application No. 08/313,659, filed on Sep. 27, 1994, now abandoned, which is a continuation of application No. 08/183,209, filed on Jan. 18, 1994, now abandoned, which is a continuation of application No. 07/966,670, filed on Oct. 26, 1992, now abandoned, which is a continuation of application No. 07/691,159, filed on Apr. 24, 1991, now abandoned, which is a continuation of application No. 07/406,935, filed on Sep. 13, 1989, now abandoned.

(51) Int. Cl.$^7$ .................................................. C09J 123/08
(52) U.S. Cl. ..................... 524/579; 524/474; 524/476; 524/484; 524/490; 524/570
(58) Field of Search .................................. 524/474, 476, 524/477, 485, 487, 489, 570, 579, 484, 490

(56) References Cited

U.S. PATENT DOCUMENTS

| | | | |
|---|---|---|---|
| 3,362,940 | 1/1968 | Edwards et al. | 260/88.2 |
| 3,492,372 | 1/1970 | Flanagan | 260/897 |
| 3,514,417 | 5/1970 | Bickel et al. | 260/27 |
| 3,725,330 | 4/1973 | Shiarto et al. | 260/33.6 |
| 4,072,735 | 2/1978 | Ardemagni | 260/897 |
| 4,471,086 | 9/1984 | Foster | 524/489 |
| 4,508,842 | 4/1985 | Beran et al. | 502/112 |
| 4,568,713 | 2/1986 | Hansen et al. | 524/291 |
| 4,668,575 | 5/1987 | Schinkel et al. | 428/349 |
| 4,761,450 | 8/1988 | Lakshmanan elt al. | 524/488 |
| 4,808,561 | 2/1989 | Welborn, Jr. | 502/104 |
| 4,824,889 | 4/1989 | Mostert | 524/232 |
| 4,826,909 | 5/1989 | Lakshmanan et al. | 524/478 |
| 4,833,192 | 5/1989 | Lakshmanan et al. | 524/476 |
| 5,084,534 | 1/1992 | Welborn, Jr. et al. | 526/160 |
| 5,324,800 | 6/1994 | Welborn, Jr. et al. | 526/160 |
| 5,397,843 | 3/1995 | Lakshmanan et al. | 525/240 |

FOREIGN PATENT DOCUMENTS

| | | |
|---|---|---|
| 0 057 891 | 8/1982 | (EP) . |
| 0 115 434 | 8/1984 | (EP) . |
| 0 129 368 | 12/1984 | (EP) . |
| 0 208 075 | 1/1987 | (EP) . |
| 0 260 999 | 3/1988 | (EP) . |
| 0 319 043 | 6/1989 | (EP) . |
| 236804 | 10/1986 | (JP) . |
| 121709 | 6/1987 | (JP) . |
| 129303 | 6/1987 | (JP) . |
| 90/03414 | 4/1990 | (WO) . |
| 92/12212 | 7/1992 | (WO) . |

*Primary Examiner*—Fred Teskin
(74) *Attorney, Agent, or Firm*—Myron B. Kurtzman; Catherine L. Bell; Stephen D. Prodnuk

(57) ABSTRACT

Disclosed are hot melt adhesives comprising ethylene/alpha-olefin copolymers prepared with either supported or unsupported metallocene-alumoxane catalysts for applications in hot melt adhesives used in automotive product assembly, packaging and food packaging. These ethylene copolymers have weight average molecular weight ranging from about 20,000 to about 100,000 and comonomer weight percent ranging from about 6 to about 30. The hot melt adhesive composition includes the ethylene copolymer and a compatible tackifier at a ratio of tackifier to copolymer of from 70:30 to 30:70 and may also include up to 30 weight percent of a paraffinic and microcrystalline wax of the copolymer and tackifier.

5 Claims, No Drawings

ELASTOMERIC ETHYLENE COPOLYMERS FOR HOT MELT ADHESIVES

This application is a continuation of Ser. No. 08/610,601 filed Mar. 8, 1996, abandoned, which is a continuation of Ser. No. 08/410,656 filed Mar. 24, 1995, now U.S. Pat. No. 5,530,054, which is a continuation of Ser. No. 08/313,659 filed Sep. 27, 1994, abandoned, which is a continuation of Ser. No. 08/183,209 filed Jan. 18, 1994, abandoned, which is a continuation of Ser. No. 07/966,670 filed Oct. 26, 1992, abandoned, which is a continuation of Ser. No. 07/691,159 filed Apr. 24, 1991, abandoned, which is a continuation of Ser. No. 07/406,935, filed Sep. 13, 1989, abandoned.

BACKGROUND OF THE INVENTION

1. Field of the Invention

This invention relates to hot melt adhesives based on elastomeric ethylene copolymers. In particular, the invention relates to hot melt adhesives especially comprising ethylene/alpha-olefin copolymers wherein the alpha-olefin can have from 3–20 carbon atoms such as ethylene/butene-1, ethylene/hexene-1, ethylene/octene-1, and ethylene/propylene copolymers. These ethylene copolymers with prescribed range of comonomer levels can be prepared by polymerization of the suitable olefins in the presence of supported or unsupported metallocene-alumoxane catalysts systems.

2. Description of the Prior Art

Hot melt adhesives are mixtures of polymer and adjuvants, usually tackifying resin, wax, or low Tg materials such as oils and low molecular weight polymers. The polymer contributes cohesive strength to the final formulation. It is well known that highly crystalline polymers show very poor adhesive performance at temperatures below room temperature due to brittleness, hence, somewhat elastic polymers are most useful in hot melt adhesives. In addition, the presence of the comonomer improves adhesion of the final hot melt adhesive formulation to metal and polar substrates such as aluminum and glass.

Copolymers of ethylene and a mono-olefinically unsaturated polar comonomer such as vinyl acetate, methyl acrylate, acrylic acid and the likes, have been reported as useful polymers to formulate into hot melt adhesives. These hot melt adhesives generally are lacking in elevated temperature performance. These hot melt adhesives, although useful with polar substrates, are less useful with non-polar substrates.

Hot melt adhesives prepared with EVA (ethylene/vinyl acetate copolymer) containing high levels of vinyl acetate are generally ineffective in laminating non-polar plastic surfaces to the same plastic surfaces or to other surfaces. For example, polypropylene is widely used for product assembly in automobile industry due to low cost and solvent resistance. The polypropylene parts need a hot melt adhesive to bond to other polymer parts or bond to other substrates such as steel, aluminum, glass, etc. Besides excellent adhesion, another highly desirable requirement of the hot melt composition is its elevated temperature properties. Besides product assembly applications, polypropylene is widely used in film and in cast sheet form for packaging articles and for packaging food and such packaging requires closure which can resist mechanical breakage.

U.S. Pat. No. 4,072,735 discloses the preparation of a hot melt pressure sensitive adhesive which comprises ethylene-propylene rubber, tackifying resin, polybutene, and, optionally, a crystalline polypropylene. The addition of the crystalline polypropylene is required in order to obtain a useful adhesive at elevated temperatures.

U.S. Pat. No. 4,568,713 discloses a hot melt adhesive system comprising butene-1/ethylene copolymer (containing 5.5–10.0 wt. % ethylene), an aliphatic/non-polar tackifier, an antioxidizing agent and, optionally, microcrystalline wax. The patent discloses utility for long open time and the need for good cold metal bonding to steel and aluminum.

JP-62-129303 discloses the preparation of ethylene/alpha-olefin copolymers using metallocene-alumoxane catalysts. While the products obtained are olefin copolymers having narrow molecular weight distributions and relatively low softening points, these copolymers are waxes characterized by only slight surface stickiness or slight adhesiveness, and are therefore used as pigment dispersing agents and toners.

JP-61-236804 discloses preparing narrow molecular weight distribution ethylene/alpha-olefin copolymers with metallocene-alumoxane catalysts, however, these ethylene/alpha-olefin copolymer products are also waxes that are used as pigment dispersants and resin processing aids. No adhesive characteristics are taught for these products.

JP-62-121709 pertains to the copolymerization of ethylene with an alpha-olefin in the presence of a catalyst comprising a zirconium hydride compound such as a bis(cyclopentadienyl) zirconium monochlorohydride and an alumoxane to obtain a copolymer which is narrow in both molecular weight distribution and composition distribution. However, while the copolymer is excellent in transparency, impact resistance and heat sealability, it is also characterized by surface non-stickiness.

There is an apparent need in the art to obtain hot melt adhesives having improved elevated temperature properties, and better low temperature flexibility.

SUMMARY OF THE INVENTION

It is an objective of this invention to provide hot melt adhesives based on ethylene copolymers which provide good adhesive performance on plastic surfaces, in particular polypropylene and polyethylene. It is another objective of this invention to provide a hot melt adhesive which does not need the addition of an elastomer to modify final performance such as increased high temperature resistance and improved adhesion on non-polar surfaces.

It has been surprisingly found that ethylene/alpha-olefin copolymers having certain molecular weight ranges and certain comonomer level ranges can be utilized in formulating an adhesive formulation absent an elastomeric resin when the copolymers are prepared in the presence of a catalyst system comprising a Group IVB transition metal-cyclopentadienyl containing catalyst such as, for example, either supported or unsupported metallocene-alumoxane catalysts. The hot melt adhesive formulations comprise one of these copolymers, tackifier(s), and optionally, wax or oil. In the hot melt adhesive applications, the weight average molecular weight ($M_w$) values of the copolymer will range from about 20,000 to about 100,000, preferably from 40,000 to 80,000, and the comonomer level will range from about 6 wt. % to about 30 wt. %, preferably from 10 wt. % to 20 wt. %.

The ethylene-co-alpha olefin polymers of the present invention can be produced in accordance with any known polymerization process, including a slurry polymerization, gas phase polymerization, and high pressure polymerization process.

A slurry polymerization process generally uses super-atmospheric pressures and temperatures in the range of 40–110° C. In a slurry polymerization, a suspension of solid, particulate polymer is formed in a liquid polymerization medium to which ethylene and comonomers and often hydrogen along with catalyst are added. The liquid employed in the polymerization medium can be an alkane, cycloalkane, or an aromatic hydrocarbon such as toluene, ethylbenzene or xylene. The medium employed should be liquid under the conditions of polymerization and relatively inert. Preferably, hexane or toluene is employed.

In modification, the polymer components of the present invention may be formed by gas-phase polymerization. A gas-phase process utilizes super-atmospheric pressure and temperatures in the range of about 50°–120° C. Gas phase polymerization can be performed in a stirred or fluidized bed of catalyst and product particles in a pressure vessel adapted to permit the separation of product particles from unreacted gases. Thermostated ethylene, comonomer, hydrogen and an inert diluent gas such as nitrogen can be introduced or recirculated so as to maintain the particles at a temperature of 50°–120° C. Triethylaluminum may be added as needed as a scavenger of water, oxygen, and other adventitious impurities. Polymer product can be withdrawn continuously or semi-continuously at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

The polyethylene copolymers of the present invention can also be produced in accordance with a high pressure process by polymerizing ethylene in combination with other monomers such as butene-1, hexene-1, octene-1, or 4-methylpentene-1 in the presence of the catalyst system comprising a cyclopentadienyl-transition metal compound and an alumoxane compound. As indicated more fully hereinafter, it is important, in the high-pressure process, that the polymerization temperature be above about 120° C. but below the decomposition temperature of said product and that the polymerization pressure be above about 500 bar (kg/cm$^2$). In those situations wherein the molecular weight of the polymer product that would be produced at a given set of operating conditions is higher than desired, any of the techniques known in the prior art for control of molecular weight, such as the use of hydrogen or reactor temperature, may be used in the process of this invention.

DETAILED DESCRIPTION OF THE INVENTION

The ethylene copolymer(s) adhesive formulations of this invention comprise copolymers prepared in the presence of Group IVB (66th Edition of Handbook of Chemistry and Physics, CRC Press, 1985–1986, CAS version) transition metal, cyclopentadienyl containing catalysts. The copolymers are ethylene/alpha-olefin copolymers wherein the alpha-olefin can have from 3 to 20 carbon atoms. Illustrative of the alpha-olefins are butene-1, hexene-1, octene-1 and propylene. The copolymers can also include a minor amount of diene such as 1,4-hexadiene, 4-methyl-1,4-hexadiene, 4-methyl-1,4-hexadiene, α,w-diene such as 1,4-pentadiene, 1,5-hexadiene, and norbornene and its derivatives typically up to 2 mole percent.

Illustrative of the Group IVB transition metal-cyclopentadienyl containing catalysts are the supported or unsupported metallocene-alumoxane catalysts. These catalysts and the methods of preparing the same are well known, as shown in U.S. Pat. No. 4,808,561 and European Patent Application Publication 84-303805.0 both incorporated herein by reference in their entirety. These catalysts comprise at least one metallocene of Group IVB of the Periodic Table and an alumoxane and in the supported case a support material such as silica to provide a supported metallocene-alumoxane reaction product.

Alumoxanes are well known in the art and comprise oligomeric linear and/or cyclic alkyl alumoxanes represented by the formula:

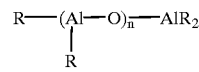

for oligomeric, linear alumoxanes and

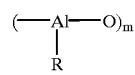

for oligomeric, cyclic alumoxane, wherein n is 1–40, preferably 10–20, m is 3–40, preferably 3–20 and R is a $C_1$–$C_8$ alkyl group and preferably methyl.

The supported reaction product will polymerize ethylene and one of the aforementioned alpha-olefins at commercially acceptable rates without the presence of the objectionable excess of alumoxane as required in the homogeneous system.

European Patent Application Number 87308359.6 discloses a process for polymerizing ethylene, either alone or in combination with other monomers such as alpha-olefins, with a homogeneous catalyst comprising a cyclopentadienyl-transition metal compound and an alumoxane compound at elevated temperatures and pressures. The ratio of aluminum in the alumoxane to the total metal in the metallocene is in the range of 1000:1 to 0.5:1. This patent application is incorporated herein in its entirety.

The ethylene copolymers may be used as an adhesive layer in the metallic or polymeric laminate by conventional laminating techniques, such as, for example, coextrusion, extrusion coating, and the like. In a preferred embodiment, the ethylene copolymer is applied to the substrate as a hot melt adhesive containing the polymer and a compatible solid and/or liquid tackifier. The solid tackifiers typically have a softening point of from 70° to 130° C., preferably from 80° to 120° C.; a number average molecular weight of from 500 to 1300, preferably from 700 to 1300; a weight average molecular weight of from 1000 to 3000, preferably from 1200 to 2500; and a specific gravity of from 0.80 to 1.30. As suitable tackifiers these may be mentioned, aliphatic resins, polyterpene resins, hydrogenated resins and mixed aliphatic-aromatic resins well known in the art. Exemplary aliphatic resins include those available under the trade designations Escorez, Piccotac, Hercures, Hingtack, Hi-Rez, Quintone, Tackirol, etc. Exemplary polyterpene resins include those available under the trade designations Nirez, Piccolyte, Hingtack, Zonarez, etc. Exemplary hydrogenated resins include those available under the trade designations Escorez, Arkon, Clearon, etc. Exemplary mixed aliphatic-aromatic resins include those available under the trade designations Escorez, Regalite, Hercures AR, Imprez, Norsolene M, Marukarez, Arkon M, Quintone, etc. Other tackifiers may also be employed, provided they are compatible with the ethylene copolymers. The liquid tackifier chosen is compatible with the solid tackifier used in the formulation. These liquid tackifiers typically have a softening point of from 10° to 40° C. and a weight average molecular weight of from 300 to 600. Depending on the nature and amount of the solid tackifiers used, liquid tackifier may comprise from zero to 20 weight percent of the adhesive composition.

Preferably, the HMA composition comprises the copolymer, solid tackifier and liquid tackifier. Also, a desirable HMA can comprise the copolymer and one or the other of the solid and liquid tackifiers, but preferably the solid tackifier.

The weight ratio of total tackifier to ethylene copolymer may be from about 70:30 to 30:70, and preferably from 60:40 to 40:60.

Paraffinic wax or microcrystalline wax is desirably used in the hot melt adhesive composition when low melt viscosity is desired. Depending on the nature and amount of the tackifiers used, wax may comprise from zero to 30 weight percent of the adhesive composition, preferably from zero to 20 weight percent of the adhesive composition. The hot melt composition may also include conventional additives such as pigments, fillers, antioxidants, stabilizers, and the like, in conventional amounts, but the hot melt is preferably essentially free of solvents. Antioxidants such as Irganox 1010, when used, are typically present at 0.5 weight percent of the hot melt adhesive composition.

The hot melt adhesive is prepared by conventionally melt blending the components together at elevated temperature (from about 150° to about 200° C.) under an inert gas blanket until a homogeneous mix is obtained. Any mixing method producing homogeneous blend without degrading the hot melt components is satisfactory. One well known method to the art of blending materials of this type is to carry out the hot melt blending in a heated vessel equipped with a stirrer. The molten adhesive was then poured onto a silicone coated release paper and smoothed to a thickness of about 6 mils by drawing a heated bar across the adhesive layer. The adhesive film, after being cooled down and peeled off from the release paper, was used for subsequent adhesive tests.

The hot melt adhesive, in addition to having enhanced adhesion to various substrates such as aluminum, polyethylene, and polypropylene, has the further advantage that the hot melt composition has good elevated temperature properties such as SAFT and PAFT compared to commercial EVA hot melt compositions.

Testing Methods

1. Compatibility

The cloud point is the temperature at which the clear and molten adhesive composition cools to give the first indication of a cloud or haze. It provides a measure of compatibility of tackifier in a hot melt adhesive compound.

2. T-Peel Strength

T-Peel strength is defined as the average load per unit width of bond line required to produce progressive separation of 2 bonded adherends. Separation speed is 2 inches/minute.

3. Shear Adhesion Failure Temperature (SAFT)

One inch×one inch lap shear bonds to Kraft paper are prepared. Samples are hung vertically in an air circulating oven at 30° C. and a 500 gram weight is suspended from the bottom strip. The oven temperature is raised 10° F. every 15 minutes. The shear-fail temperature is the average of three readings.

4. Peel Adhesion Failure Temperature (PAFT)

One inch×three inch adhesive bonds to Kraft paper are prepared. Samples are hung horizontally (in peel mode) in an air circulating oven and a 100 gram weight is suspended from the free end of the bond. The oven temperature is raised 10° F. every 15 minutes. The peel-fail temperature is the average of three readings.

5. Polymer Melt Index

Melt Index (abbreviated MI) was measured according to ASTM D1238, condition E, 190° C., and 2.16 kg. These are typical conditions used for polyethylenes and EVA polymers.

6. Crystalline Melting Point (abbreviated Tm)

Tm was determined by Differential Scanning Calorimetry (abbreviated DSC). Heating and cooling rates were 10° C./minute. Tm is the temperature at which a maximum occurs in the heat absorption curve.

The invention is illustrated by way of the following examples.

EXAMPLES 1 AND 2

The catalyst for polymerizing the ethylene copolymers was prepared as follows. An 800 gram quantity of silica gel and a 2700 ml aliquot of methylalumoxane/toluene solution (10%) were placed in a two-gallon reactor and allowed to react at ambient temperature for one hour. A 21.6 gram quantity of bis(indeny)lzirconium dichloride slurried in 300 ml of toluene was added into tne reactor and the mixture was allowed to react at 65° C. for 30 minutes. The reactor was then heated at 75° C. while nitrogen gas was purged through the reactor to remove the solvent. The heating and nitrogen purging were stopped when the mixture in the reactor turned into a free-flowing powder.

The polymerization was conducted in a 16-inch diameter fluidized bed gas-phase reactor. Ethylene, butene-1, and nitrogen were fed continuously into the reactor to maintain a constant production rate. Product was periodically removed from the reactor to maintain the desired bed weight. The polymerization conditions are shown in Table I.

TABLE I

| Gas Phase Polymerization | |
| --- | --- |
| Temperature (° F.) | 143 |
| Total Pressure (psia) | 300 |
| Gas Velocity (ft/sec) | 1.5 |
| Catalyst Feed Rate (g/hr) | 11 |
| Production Rate (lb/hr) | 29 |

The polymerized product had a number average molecular weight ($M_n$) of 20,000, a weight average molecular weight ($M_w$) of 50,000, and hence a ratio of $M_w$ to $M_n$ of 2.50. The polymer had values of MI and Tm of 24 and 79° C., respectively. The polymer had a viscoelastic loss peak as determined on a Rheometrics System IV Spectrometer at −46° C. Butene-1 weight percent in the polymer was 16 and specific gravity of the polymer is 0.898. Hot melt adhesive performance of compositions based on this ethylene copolymer was compared to compositions based on an EVA copolymer (Table II). This EVA polymer had an $M_n$ of 19,000, an $M_w$ of 41,000, and hence an $M_w/M_n$ ratio of 2.16. This EVA polymer had values of MI and Tm of 32 and 69° C., respectively. This polymer had a viscoelastic loss peak at −29° C. Vinyl acetate weight percent in the polymer is 28 and specific gravity of the polymer is 0.934. Escorez 2393 is a mixed aliphatic-aromatic resin. Foral 105 is a rosin ester. Escorez 5380 and Escorez 5300 are hydrogenated cyclic solid resins. Aristowax 165 is a paraffinic wax with Tm of 68° C. Resin A is a hydrogenated cyclic liquid hydrocarbon resin which has a softening point of 37° C. and a Mw of 340, Mw/Mn=3.3, Tg=−13° C.

TABLE II

| Formulation | 1 | 18 | 138-3 | 99-15 |
|---|---|---|---|---|
| EVA | 45 | 45 | — | — |
| Ethylene/Butene-1 Copolymer | — | — | 45 | 45 |
| Escorez 2393 | 45 | — | — | — |
| Foral 105 | — | 45 | — | — |
| Escorez 5380 | — | — | 45 | — |
| Escorez 5300 | — | — | — | 45 |
| Resin A | — | — | — | 10 |
| Aristowax 165 | 10 | — | 10 | — |
| Brookfield Viscosity @ 180° C., p | 144 | 115 | 470 | 670 |
| Cloud Point, ° C. | 77 | 59 | 118 | 116 |
| Tensile Stress at 1000% Elongation, psi | 950 | 800 | 420 | 500 |
| T-Peel, lb/in | | | | |
| Aluminum | 4.1 | 5.6 | 6.3 | 2.2 |
| Polyethylene | 0.5 | 3.4 | 7.3 | 2.3 |
| Polypropylene | 0.3 | 3.3 | 16.2 | 4.0 |
| SAFT, Kraft, 1" × 1" × 500 g, ° C. | 70 | 75 | 90 | 93 |
| PAFT, Kraft, 1" × 3" × 100 g, ° C. | 59 | 55 | 51 | 64 |
| Cold Flexibility, −20° C./16 hours | | Paper Tear | | |

All hot melts contained 0.5 weight percent of Irganox 1010 based on total adhesive blend weight. It was surprisingly found that hot melts based on the ethylene/butene-1 copolymer showed good peel strength with metallic and polyolefin substrates, and high SAFT and PAFT values. The bonding conditions for T-Peel specimens were 177° C./40 psi/2 seconds for aluminum substrates, and 149° C./40 psi/2 seconds for both the polyethylene and polypropylene substrates. All these substrates were untreated.

EXAMPLES 3 AND 4

The identical ethylene/butene-1 copolymer was used to prepare two hot melt compositions based on aliphatic resins Escorez 1310LC and hydrogenated aliphatic resins Resins B and C (Table III). Resins B is a solid hydrogenated aliphatic resin. Resin C is a liquid hydrogenated aliphatic resin. The softening points of Experimental Resins B and C are 75° and 24° C., respectively, the $M_w$=1,400 and 460 respectively, $M_w/M_n$=1.5 and 1.4 respectively. The results are summarized in Table III.

TABLE III

| Formulation | 99-8 | 99-9 |
|---|---|---|
| Ethylene/Butene-1 Copolymer | 45 | 45 |
| Escorez 1310LC | — | 30 |
| Resin B | 40 | — |
| Resin C | 15 | 25 |
| Brookfield Viscosity @ 180° C., p | 420 | 460 |
| Cloud Point, ° C. | 117 | 112 |
| Tensile Stress at 1000% Elongation, psi | 200 | 200 |
| T-Peel, lb/in | | |
| Aluminum | 1.8 | 11.9 |
| Polyethylene | 1.7 | 0.9 |
| Polypropylene | 13.3 | 12.7 |
| SAFT, Kraft, 1" × 1" × 500 g, ° C. | 92 | 89 |
| PAFT, Kraft, 1" × 3" × 100 g, ° C. | 53 | 54 |
| Cold Flexibility, −20° C./16 hours | Paper Tear | |

It was surprisingly found that hot melts based on the ethylene/butene-1 copolymer showed good peel strength with metallic and polyolefin substrates, especially with polypropylene, and high SAFT and PAFT values. The bonding conditions for T-Peel specimens were identical to conditions used in Examples 1 and 2. All these substrates were untreated.

EXAMPLES 5 AND 6

The procedures of Examples 1 and 2 were followed to prepare the catalyst and the ethylene copolymer except that hexene-1 was used as the alpha-olefin monomer. The polymerized product had an $M_n$ of 28,000, an $M_w$ of 54,000, and an $M_w/M_n$ ratio of 1.93. The polymer had values of MI and Tm of 14 and 96° C., respectively. The polymer had a viscoelastic loss peak as determined on a Rheometric System IV Spectrometer at −52°. Hexene-1 weight percent in the polymer was 16 and specific gravity of the polymer is 0.901. This polymer was used to prepare two hot melt compositions based on aliphatic resins Escorez 1310LC, and Resins B and C (Table IV). All hot melts contained 0.5 weight percent of Irganox 1010 based on total adhesive blend weight. It was surprisingly found that hot melts based on the ethylene/hexene-1 copolymer showed good peel strength with metallic and polyolefin substrates, and high SAFT and PAFT values. The bonding conditions for T-Peel specimens were identical to conditions used in Examples 1 and 2. All the substrates were untreated.

TABLE IV

| Formulation | 99-10 | 99-11 |
|---|---|---|
| Ethylene/Hexene-1 Copolymer | 45 | 45 |
| Escorez 1310LC | — | 30 |
| Resin B | 40 | — |
| Resin C | 15 | 25 |
| Brookfield Viscosity @ 180° C., p | 760 | 730 |
| Cloud Point, ° C. | 119 | 111 |
| Tensile Stress at 1000% Elongation, psi | 580 | 600 |
| T-Peel, lb/in | | |
| Aluminum | 8.0 | 2.6 |
| Polyethylene | 0.3 | 0.6 |
| Polypropylene | 8.9 | 1.0 |
| SAFT, Kraft, 1" × 1" × 500 g, ° C. | 92 | 94 |
| PAFT, Kraft, 1" × 3" × 100 g, ° C. | 72 | 70 |
| Cold Flexibility, −20° C./16 hours | Paper Tear | |

COMPARATIVE EXAMPLE

Two linear low density polyethylenes (abbreviated LLOPE-1 and LLPDE-2) containing at most 5.3 weight percent hexene-1 were used to prepare hot-melt adhesive compositions containing hydrogenated cyclic resins Escorez 5300, Escorez 5380, and Resin A (Table V). LLDPE-1 and LLDPE-2 had values of MI/specific gravity of 55/0.926 and 12/0.926, respectively. All hot melts contained 0.5 weight percent of Irganox 1010 based on total adhesive blend weight. The peel strength with untreated polypropylene of the LLDPE hot melts was inferior to the ethylene copolymeric hot melts in Examples 1–6. The bonding conditions for the T-Peel specimens in Table V was 150° C./40 psi/10 seconds.

TABLE V

| Formulation | 141-1 | 141-2 | 141-3 |
|---|---|---|---|
| LLDPE-1 | 45 | — | 40 |
| LLDPE-2 | — | 45 | — |
| Escorez 5300 | 45 | 45 | — |
| Escorez 5380 | — | — | 40 |
| Resin A | 10 | 10 | 20 |
| Viscosity* @ 180° C., p | 460 | 1800 | — |

TABLE V-continued

| Formulation | 141-1 | 141-2 | 141-3 |
|---|---|---|---|
| T-Peel, lb/in | | | |
| Polypropylene | 0.4 | 0.5 | 0.5 |

*Complex viscosity as determined on Rheometrics System IV Spectrometer.

While the specific examples delineate adhesive copolymers with ethylene and the alpha-olefins of butene-1 and hexene-1, it is to be appreciated that any of the alpha-olefins having 3 or more carbon atoms are suitable in the context of the invention. Thus, propylene, pentene-1, 3-methyl pentene-1,4-methyl pentene-1, octene-1, and the like, and mixtures thereof typify the operable comonomers within the context of the invention. Also, the foregoing examples are illustrative and explanatory of the invention, and many variations in the specific details thereof will become apparent to those skilled in the art in view thereof. It is intended that all such variations within the scope or spirit of the appended claims be embraced thereby.

What is claimed is:

1. A hot melt adhesive composition comprising: a copolymer of ethylene and about 6 to 30 wt % of a $C_4$ to $C_{20}$ alpha olefin, wherein said copolymer was produced in the presence of a catalyst comprising a cyclopentadienyl-transition metal compound, said copolymer comprising from about 30 to 70 wt % of said composition and having a weight average molecular weight in the range from greater than 40,000 to about 100,000; and a tackifier.

2. The hot melt adhesive composition of claim 1, wherein said alpha olefin has from 4 to 8 carbon atoms.

3. The hot melt adhesive composition of claim 1, wherein said copolymer has a weight average molecular weight of from greater than 40,000 to about 80,000.

4. The hot melt adhesive composition of claim 1, wherein the tackifier is selected from the group consisting of aliphatic resins, polyterpene resins, hydrogenated resins and mixed aliphatic-aromatic resins.

5. The hot melt adhesive of claim 1, wherein the tackifier includes a solid tackifier and a liquid tackifier.

* * * * *